United States Patent [19]

Roullet

[11] Patent Number: 4,462,221
[45] Date of Patent: Jul. 31, 1984

[54] APPARATUS FOR COOLING BULK PRODUCTS

[75] Inventor: Alain Roullet, Villejuif, France

[73] Assignee: L'Air Liquide, Societe Anonyme Pour L'Etude Et L'Exploitation Des Procedes Georges Claude, Paris, France

[21] Appl. No.: 413,451

[22] Filed: Aug. 31, 1982

[30] Foreign Application Priority Data

Sep. 10, 1981 [FR] France .............................. 81 17156

[51] Int. Cl.³ ............................................ F25D 25/02
[52] U.S. Cl. ...................................... 62/381; 62/304; 165/95
[58] Field of Search ...................... 62/381, 303; 165/95

[56] References Cited

U.S. PATENT DOCUMENTS

| 1,032,223 | 7/1912 | Loring | 62/381 |
| 2,284,270 | 5/1942 | Eberts . | |
| 3,477,242 | 9/1969 | Lamb . | |

FOREIGN PATENT DOCUMENTS 1932376 11/1976 Australia .
814894 10/1974 Belgium .
1226297 11/1960 France .
1440326 4/1966 France .
1536626 8/1968 France .
1546852 10/1968 France .
2402421 6/1979 France .

Primary Examiner—Ronald C. Capossela
Attorney, Agent, or Firm—Young & Thompson

[57] ABSTRACT

Bulk products are cooled by feeding them into a substantially horizontal drum that rotates about its axis. The drum is housed within an insulated enclosure and has a perforated cylindrical wall. The enclosure is subdivided by a wall that extends parallel to the axis of the cylinder; and this latter wall is sealed against the cylinder in such a way that access between the two sides of this latter wall can only be through the cylinder. Cooling gas is then forced upwardly through the cylinder by a fan disposed in this latter wall. The holes through the cylinder are in the form of peripherally elongated slots; and a brush in continuous contact with the periphery of the cylinder not only provides a portion of the seal that forces the cooling gas to pass through the cylinder, but also cleans these slots.

7 Claims, 3 Drawing Figures

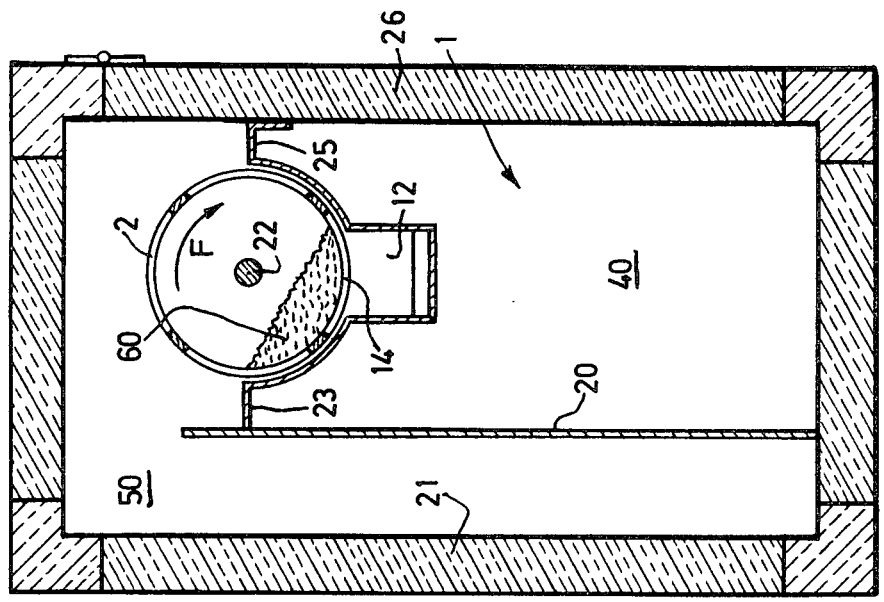
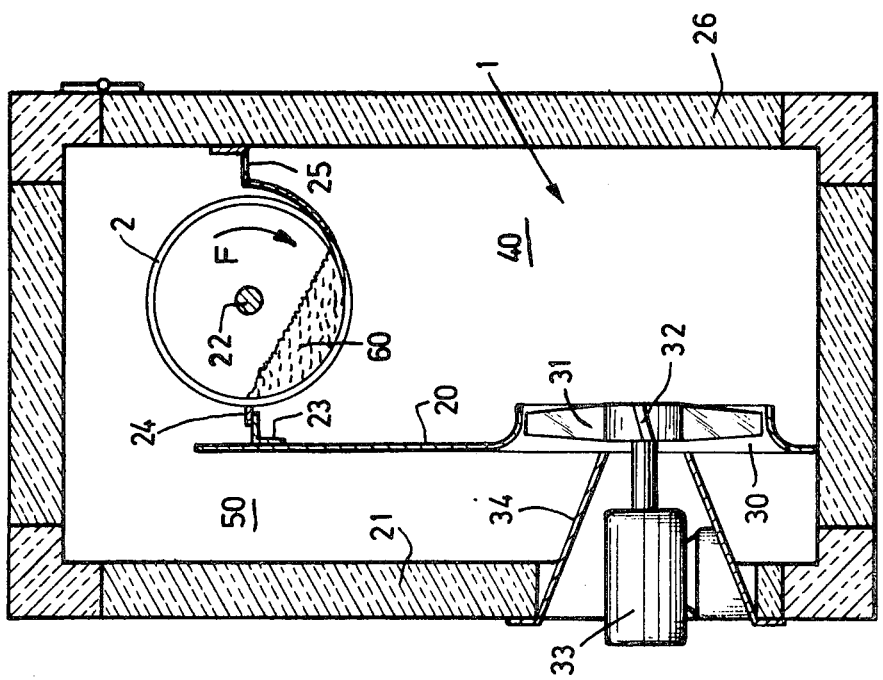

APPARATUS FOR COOLING BULK PRODUCTS

The invention relates to the cooling of bulk products. Up to the present time, various means have been proposed for cooling bulk products, generally consisting of thermally-insulated tunnels associated with a means of cooling, for instance injection of a cryogenic fluid and one or more conveyer belts for the bulk products entered at one end of the belt and recovered after cooling at the other end. When a single conveyer belt is used, it is not possible to provide effective cooling except for the upper part of the bulk product layer on the belt and, in most cases, no reliance should be placed on in-depth thermal distribution, because the products in question are not normally sufficiently in internal contact and in addition, have poor intrinsic thermal conductivity. Where foodstuffs are concerned, it is not unusual for them, having a varying water content, to stick to the belt, which leads to damage being caused when they are collected at the tunnel outlet. In order to overcome these disadvantages, proposals have indeed been made to use tunnels containing multiple belts which, as a result of their arrangement, also make it possible to turn over the products themselves. However, these arrangements are complex and costly and, in addition, do not make it possible to compensate for the poor inherent conductivity of the product.

It has also been suggested that such conveyer belts be immersed in a bath of cryogenic fluid, which would bring about thermal transfer of the cooling energy throughout the whole layer. However, this type of tunnel has poor thermal efficiency because of the fact that the major part of the temperature drop is brought about by the latent heat from the change of state in the cryogenic fluid, which is generally liquid nitrogen. Arrangements have also been proposed where the bulk products have been liquidized using a gas which can be a cryogenic gas. However, in this case, drawbacks connected with the liquidizing principle are encountered, involving a very specific size grading for the products to be liquidized, which excludes a major share of foodstuffs, unless they are broken down into particles having a diameter of less than 10 mm.

It has similarly been suggested that an axially-rotating drum be used along with a drive motor, a thermally-insulated enclosure of length greater than the drum's axis and surrounding it, together with provision for injecting cooling fluid, generally solid carbon dioxide, and having a means of circulating the gas within the enclosure, but the structural requirements and the operating requirements for the equipment are such that the thermal efficiency is extremely poor, while the equipment itself is very costly.

The subject of the invention is a cooling device and process for providing continuous deep-freezing of foodstuffs or, in a general manner, cooling of bulk foodstuffs or industrial products with particularly effective thermal transfer in the product layer, where all types of product are processed, whatever their size, density and/or thermal conductivity, and where cooling is effected quickly and in depth without bringing about product adhesion, abrasion or any other damage of mechanical origin.

The invention relates to a bulk product cooling device of the rotating drum type as mentioned above, and is designed in combination with the following two provisions:

(a) the enclosure is divided longitudinally into two longitudinal compartments by walls running in contact with the aforesaid drum at spaced-apart areas along the circumference and at least one of the aforesaid walls incorporates a passage-way in which facilities for gas circulation are mounted.

(b) the drum has holes perforated uniformly around all the side cylindrical walls.

This combination of provisions makes it possible to obtain substantial gas circulation through the layer which is being mixed by the rotation of the drum, without reaching the liquidization stage, which is still undesirable. In this way, fast cooling of the bulk products is obtained, going as far as fast deep-freezing of bulk foodstuffs, basically by the convection effect through the product layer, so that all sorts of products may be processed in this way, whatever their shape, dimension and type. Because of the mixing resulting from products being turned over, better uniformity of temperature within the product layer is obtained and any adhesion or other damage harmful to the good quality of the product is certainly avoided.

The characteristics and advantages of the invention will be made clear by the description which is given hereafter, as an example, with reference to the appended drawings, in which:

FIG. 2 is a transverse section along the line II—II in FIG. 1

FIG. 3 is a transverse section along the line III—III in FIG. 1.

Figure 1:
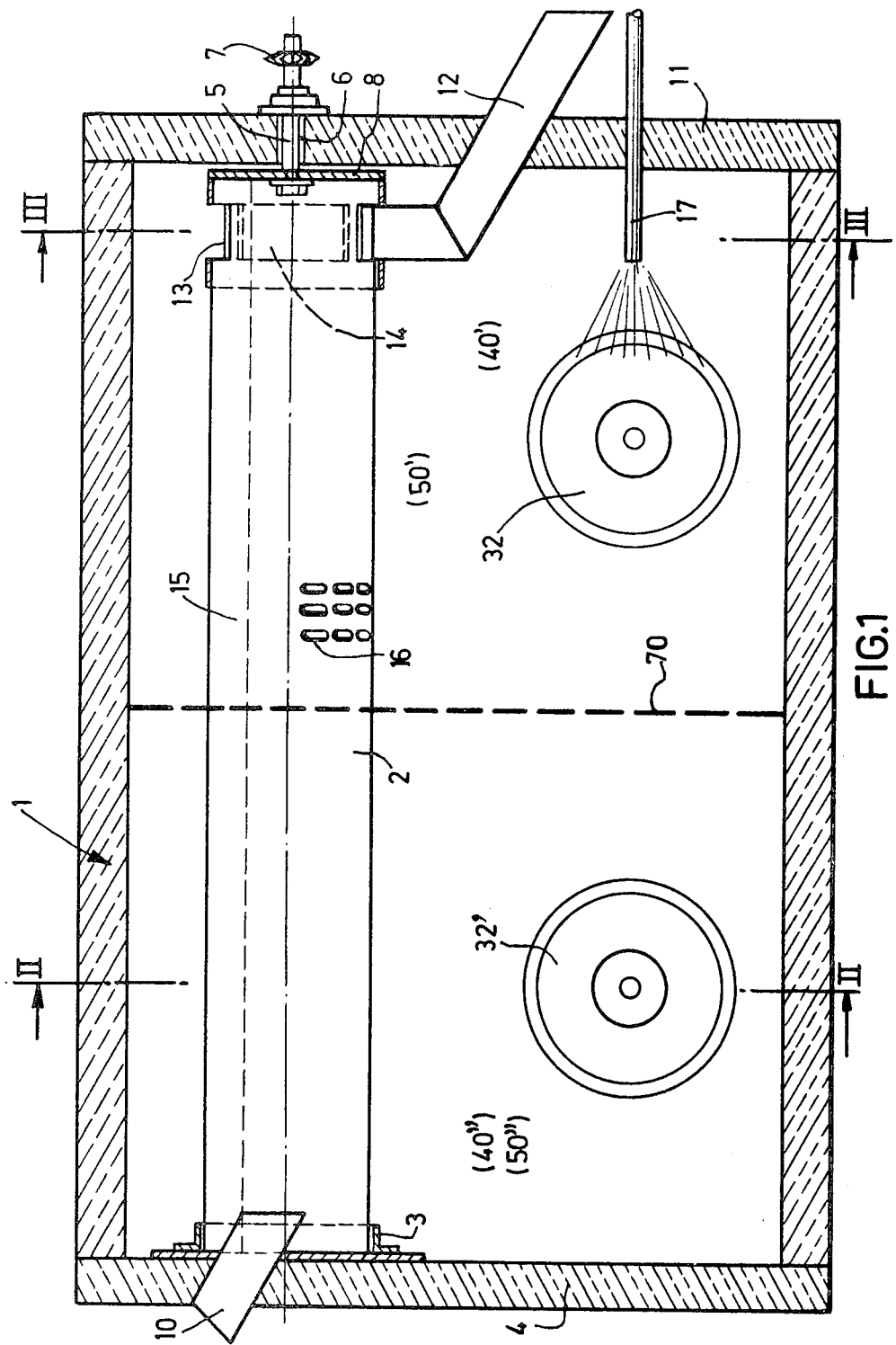
FIG. 1 is a longitudinal section of the cooling device in accordance with the invention

Referring to the appended drawings, the cooling device consists of a thermally insulated closed enclosure (1), of elongated rectangular shape, a horizontal axis cylindrical drum (2) mounted at one end on a bearing (3) on one wall of the enclosure (4) and at the other end by a terminal flange (8) on a shaft (5) running in a bearing (6), shaft (5) extending from the inside of enclosure (1) and incorporating a drive facility, of which only the drive pinion (7) has been represented.

On the bearing side (3) and through the enclosure wall (4) there is a discharge chute (10) for continuous input of the bulk product. On the side of the other, facing enclosure wall (11), a collection device has been set up to collect processed products continously, comprising a removal chute (12) below the drum (2) which is at the same level as a smaller diameter cylindrical section (13) and is part of the drum body (2), this smaller diameter cylindrical section (13) having one or more limited circumferential openings (14), so that every time the opening (14) passes in front of the upper outlet to the chute (12), bulk product can be discharged into this chute (12). Drum (2) incorporates holes over the whole of its cylindrical wall (15) these holes consisting of a very large number of oblong perforations (16), the longer dimension being in the circumferential direction of the drum and the smaller dimension being parallel with the drum axis. On the same side discharge chute (12) there is a liquid nitrogen spray nozzle (17) which extends into the inside of the enclosure and which is connected to a source of pressurized nitrogen, not shown.

The enclosure (2) is subdivided internally by a set of walls comprising one vertical wall (20) located at a short distance from a lateral enclosure wall (21) and over a sufficient height so that it substantially exceeds the level of the shaft (22) of drum (2). At the level of this shaft (22), the wall (20) is fitted with a horizontal extension (23) comprising a brush (24) which makes contact with the outside wall of the drum (2), whereas in a spaced-out circumferential area along the drum (2), a second wall (25) extends from the side enclosure wall (26) in the shape of a sheet which lightly brushes the drum's outside wall (2) in the direction of rotation of this drum (F).

The vertical wall (20) contains an opening (30) in which there is located a set of blades (31) on a fan (32) the motor being represented at (33). The existence of a collar (34) will also be noticed, to provide a seal between the enclosure and the outside.

It will be observed that, in this manner, a subdivision of the enclosure (1) has been effected into two longitudinal compartments (40) and (50), compartment (40) receiving the gas flow forced in by the fan blades (31) of fan (32) and forcing it through the drum (2) depending on the cross-section available between the brush (24) and the end of wall (25).

In operation, it is thus to be observed that bulk product (60) which is continously fed in by feed chute (10) and continuously collected by the discharge chute (12) is, during rotation of the drum, positioned in the form of a layer as represented in FIG. (2), extending virtually from the end of the brush (24) to the end of the wall (25). It may thus be understood that with this arrangement, the whole of the gas flow forced to circulate by the blades (31) of fan (32) passes through the bulk products which are at the same time subjected to a repetitive inverting motion. The convection gas is cooled by liquid nitrogen injected by nozzle (17) and an excess pressure valve (not shown) has naturally been provided at an appropriate point to expel to the atmosphere the excess gas resulting from the incoming liquid nitrogen. The cooling gas which has passed through the product layer during cooling escapes through the other wall of the drum and is again sucked up by the channel compartment (50) provided between the wall (20) and the enclosure wall (21) by fan (32). Preferably, as is shown in FIG. 1, there should be several gas circulation facilities such as (32) and (32'), so as to obtain an essentially transverse circulation of the cooling gas. The number of circulating devices such as (32)–(32') should increase as the length of the tunnel increases. It is also possible to arrange it so that each fan is housed in a special compartment by providing transverse walls as represented at (70) in FIG. 1, which divides up each of the compartments (40) and (50) into two transverse compartments (40')–(40'') and (50')–(50'') and, naturally, in this case, the nitrogen injection nozzle rod (17) must be provided on the side on which products are withdrawn, so as to provide a flow of cooling gas in the reverse direction to the direction of movement of products in the cooling drum (2).

In the preferred arrangement, the oblong perforations have an extension in the circumferential direction, which gives them an important advantage by the fact that brush (24) can thus easily unblock them continuously, thereby avoiding any obstruction by particles of the bulk product. It should also be noticed that this brush (24) not only is used for this permanent cleaning function, but also provides sufficient sealing for the major part of the gas flow to pass through the products contained in the drum (2).

As an extra feature, it will be noted that the width of the oblong holes (16) is adapted to the dimensions of the products to be cooled, in that the length must be at least three times the width if the de-icing brush (24) is to work effectively.

The optimum perforation ratio in the wall of the cylinder is between 30 and 50%, and the objective to be sought must make appropriate allowance for:
 the mechanical strength of the drum
 and the load losses compatible with good, but not excessive gas distribution, which would lead to excess fan power consumption.

The rotational speed of the drum (2) must provide for sufficient mixing of the product, through without leading to centrifugal effects. A speed of 10 to 15 rpm corresponds well to these requirements. The product is also distributed in drum (2) by means of this mixing effect which in addition facilitates longitudinal movement.

The time that the products spend in the drum depends on the operation it is wished to perform. It bears a direct relationship with the physical characteristics of the product. Adjustment of the hold time may be effected by one of the two following techniques:
 inclination of the drum, e.g: an inclination which rises 5 cm per linear meter will double the hold time.
 positioning a circular shutter at the end of the drum which thus creates a step barrier and increases product hold time.

Forced ventilation velocity must be in the region of 2 to 5 m/s if a good heat transfer factor is to be obtained, while at the same time maintaining accpetable ventilation power.

The total forced ventilation power must thus, in this case, be in the region of 5 to 10 W/kg for a foodstuff, that is geometrically shaped as a 7 mm-side cube, to be deep-frozen. It is specifically stated that any other cooling means may also be used.

The invention applies particularly to the deep-freezing of bulk products, and in particular solid products of agricultural origin of relatively small dimensions such as, for instance:
 whole, sliced, or diced mushrooms
 peas
 carrot slices
 green beans
 potatoes cut to make French fried or diced potatoes
 red fruit, in particular including strawberries, bilberries, black currants, gooseberries.

The invention does however apply to the cooling of all other industrial bulk products, e.g. parts to be made brittle or for flash trimming.

I claim:

1. Apparatus for cooling bulk products, comprising a perforated drum that rotates about a substantially horizontal axis, means to introduce material to be cooled into one end of the drum, means to withdraw cooled material from the other end of the drum, means to rotate the drum, a thermally insulated enclosure within which the drum is disposed, partition means within the enclosure sealing against horizontally spaced portions of the periphery of the drum, means to introduce a cooling gas into the enclosure, and means to force said cooling gas upward through the drum between said sealing means while the drum rotates, thereby to expose material in the drum to said upwardly moving cooling gas.

2. Apparatus as claimed in claim 1, said forcing means comprising fan means disposed in said partition means to move said gas through said partition means and thence upwardly through said drum.

3. Apparatus as claimed in claim 1, said drum having holes therethrough whose total area is between 30% and 50% of the total area of the drum.

4. Apparatus as claimed in claim 1, in which said gas introducing means comprises nozzle means for spraying said gas in liquid phase into said enclosure for evaporation in said enclosure prior to upward passage through the drum.

5. Apparatus for cooling bulk material, comprising a perforated drum that rotates about a substantially horizontal axis, means to introduce material to be cooled into one end of the drum, means to withdraw cooled material from the other end of the drum, means to rotate the drum, a thermally insulated enclosure within which the drum is disposed, partition means within the enclosure sealing against spaced portions of the periphery of the drum, means to introduce a cooling gas into the enclosure, and means to force said cooling gas through the drum between said sealing means while the drum rotates, thereby to expose material in the drum to said cooling gas, said sealing means including brush means in contact with said drum, whereby said brush means serve not only as sealing means but also as cleaning means for the holes through the drum.

6. Apparatus as claimed in claim 5, said holes comprising slots elongated peripherally of the drum.

7. Apparatus as claimed in claim 6, said the peripheral length of the slots being at least three times the width of the slots.

* * * * *